(12) United States Patent
Holt et al.

(10) Patent No.: US 6,601,061 B1
(45) Date of Patent: Jul. 29, 2003

(54) SCALABLE INFORMATION SEARCH AND RETRIEVAL INCLUDING USE OF SPECIAL PURPOSE SEARCHING RESOURCES

(75) Inventors: Thomas D. Holt, Atherton, CA (US); Larry Stephen Burke, Brentwood Bay (CA)

(73) Assignee: Surfwax, Inc., Menlo Park, CA (US)

( * ) Notice: Subject to any disclaimer, the term of this patent is extended or adjusted under 35 U.S.C. 154(b) by 221 days.

(21) Appl. No.: 09/587,672

(22) Filed: Jun. 5, 2000

Related U.S. Application Data

(63) Continuation-in-part of application No. 09/565,636, filed on May 4, 2000, which is a continuation-in-part of application No. 09/336,020, filed on Jun. 18, 1999.

(51) Int. Cl.[7] .................................................. G06F 17/30
(52) U.S. Cl. .............................................................. 707/3
(58) Field of Search ................................. 707/2, 3, 4, 5, 707/6, 9, 10, 104.1; 705/1, 10

(56) References Cited

U.S. PATENT DOCUMENTS 6,134,553 A * 10/2000 Jacobson et al. ............. 707/10
6,327,590 B1 * 12/2001 Chidlovskii et al. ........... 707/5
6,363,377 B1 * 3/2002 Kravets et al. ................ 707/4

* cited by examiner

Primary Examiner—Diane D Mizrahi
Assistant Examiner—Apu M Mofiz
(74) Attorney, Agent, or Firm—Workman, Nydegger & Seel

(57) ABSTRACT

The system and method for augmenting searching for data with public search engines, by submitting searches to special purpose search resources, such as search capabilities provided by private companies, universities, government web pages, and the like is described. Toward this end, a general purpose search engine is identified, and a special purpose search resource identified. A search query is submitted to the public search engine, and a first result is received in response thereto. The search query is also submitted to the special purpose search resource, and a second response is received thereto. These first and said second results are merged into a combined search result. Techniques for identifying, determining and recording use, and verify continued availability of special purpose search resources are also disclosed.

29 Claims, 6 Drawing Sheets

FIG. 5

|     |     |     |
| --- | --- | --- |
| engine.name | = | AllTheWeb |
| engine.urlstring | = | http://www.alltheweb.com/cgi-bin/search?hits=<\*\*depth\*\*>&query= |
| engine.result.list.start | = | <DL> |
| engine.result.item.start | = | .</B> |
| engine.result.item.end | = | <DD> |
| engine.ahref.start | = | <A H |
| engine.ahref.end | = | </A> |
| engine.depth.goesdeep | = | yes |
| engine.depth.normal | = | 25 |

SCALABLE INFORMATION SEARCH AND RETRIEVAL INCLUDING USE OF SPECIAL PURPOSE SEARCHING RESOURCES

RELATED APPLICATION

This application is a continuation in part of presently co-pending application Ser. No. 09/565,636, now pending filed May 4, 2000 (entitled "Information Search, Retrieval and Distillation Into Sharable Knowledge Objects"), which is a continuation-in-part of presently co-pending application Ser. No. 09/336,020, now pending, filed Jun. 18, 1999. These related applications are hereby incorporated herein by reference.

FIELD OF THE INVENTION

The invention generally relates to searching a network for text and non-text data, and providing for storing and forwarding search results. More particularly, the invention relates to incorporating search capabilities provided by private or special purpose network resources into a general searching mechanism.

TERMINOLOGY

In the discussion below and claims that follow, an artificial distinction is made between traditional (or "public") search resources such as AltaVista-com, Excite-com, NorthernLight-com, Yahoo-com, and meta-search businesses such as SurfWax-com, Go2net-com, Dogpile-com, and the like, and "private" or "special purpose" search resources provided by individual corporate web pages, university sites, government sites (e.g., IBM-com, PCConnection-com, FindLaw-com, USPTO-gov, Harvard-edu), and the like. The former are businesses in the business of helping searches locate information (e.g., on the Internet or intranet), and are referenced hereafter as "public search resources." The latter, even if providing extensive search abilities, are not in the searching business, and are referenced hereafter as "special purpose search resources. However, it will be appreciated that since the distinction is somewhat artificial, the techniques disclosed below for manipulating special purpose search resources are also applicable to public search resources. (Please note that periods within uniform resource locators (URLs) have been replaced with hyphens to prevent hypertext links in an online copy of this application.)

BACKGROUND

Recently there has been a vast proliferation of networking connection options, for business and general users alike, for connecting to networks such as intranets and the Internet. Many such businesses and users position themselves as an end point, or point of interest (hereafter generally "web sites"), to whom others can connect and obtain information and other material. After several years of such end points becoming accessible of the networks, an enormous amount of information and other material is now available in an online electronic format.

A typical method for locating and reviewing such information is by way of a "web browser", such as Netscape Navigator, Internet Explorer, Opera, and other network application programs (hereafter generally "browsers"). Unfortunately, the very richness of available information has made finding anything specific an enormously complex and tedious task.

Typical search methods employ either data categorization or keyword searching. In the former, a well known example is the public search resource www-Yahoo-com, which provides broad categories and successively narrower topic areas. In the latter, there are typically two types. The first are traditional search engines such as NorthernLight-com, AltaVista-com, Excite-com, and the like, which "crawl" web sites and index the words found therein. The second are "meta" search engines, such as SurfWax-com, DogPile-com, and the like, which execute a search across multiple search engines, and provide options for collating results.

Unfortunately, both categorization and keyword searching have significant drawbacks. Categorization requires intervention to place in site within a relevant category or categories. Such categorization is subjective, and therefore may result in significant omissions or misleading results when a searcher drills down to detailed categories. And, categorization is resource intensive, and therefore few web sites are categorized. Typically, only "main stream" (e.g., popular) sites are categorized.

Although keyword searching does not suffer the subjective effects of categorization, such searching is based only on content identified from crawling and indexing a particular location at a web site; consequently, such content is likely to be stale and/or incomplete. Frequently, network sites, such as file servers, Internet web pages, etc., are subject to frequent changes and reorganizations of data storage that renders crawled results inaccurate. Frequently, much of a site's content is only indirectly accessible through interaction with the site, hence crawling will not find this content. Related to this, some sites provide content through dynamically generated web pages; such pages, will not exist for long after indexing. An additional problem is that crawled sources are blindly indexed without regard to origination language; thus search terms popular in a foreign language often retrieve irrelevant or incomprehensible results.

Thus, a better technique is needed for reliably indexing and retrieving data from extent search sources.

BRIEF DESCRIPTION OF THE DRAWINGS

Features and advantages of the invention will become apparent to one skilled in the art to which the invention pertains from review of the following detailed description and claimed embodiments of the invention, in conjunction with the drawings in which:

FIG. 5 illustrates a characteristic profile for a special purpose search resource.

DETAILED DESCRIPTION

Various exemplary embodiments of the invention are illustrated and discussed herein. In one embodiment, the invention is directed towards searching the Internet, which is a well-known collection of public and private data communication and multimedia networks (e.g., intranets, Wide Area Networks (WAN), Local Area Networks (LAN), wireless networks, cable television based networks, etc.), that operate using common protocols to form a world wide network of networks.

Searching can be focused on retrieving text-based documents, graphics, web pages, or other desired data types, such as structured storage (databases and the like), music, spreadsheets, and the like. For simplicity, it is assumed a search query is in English language, but, other languages and data formats (e.g., graphics) may also be searched. (For example, a graphics fragment could be dropped into a query box by way of Object Linking and Embedding (OLE) or through a Java Bean of ActiveX object.)

For the purposes of this description, the terms Uniform Resource Locator (URL), document, origination and source address are intended to be generally synonymous, as each term essentially references particular network location. For simplicity, it is assumed addresses conform to the Transmission Control Protocol/Internet Protocol (TCP/IP) dot quad format (0.0.0.0). However, it should be appreciated that other address formats (such as wireless node identifiers) may be used without loss of generality.

Figure 1:
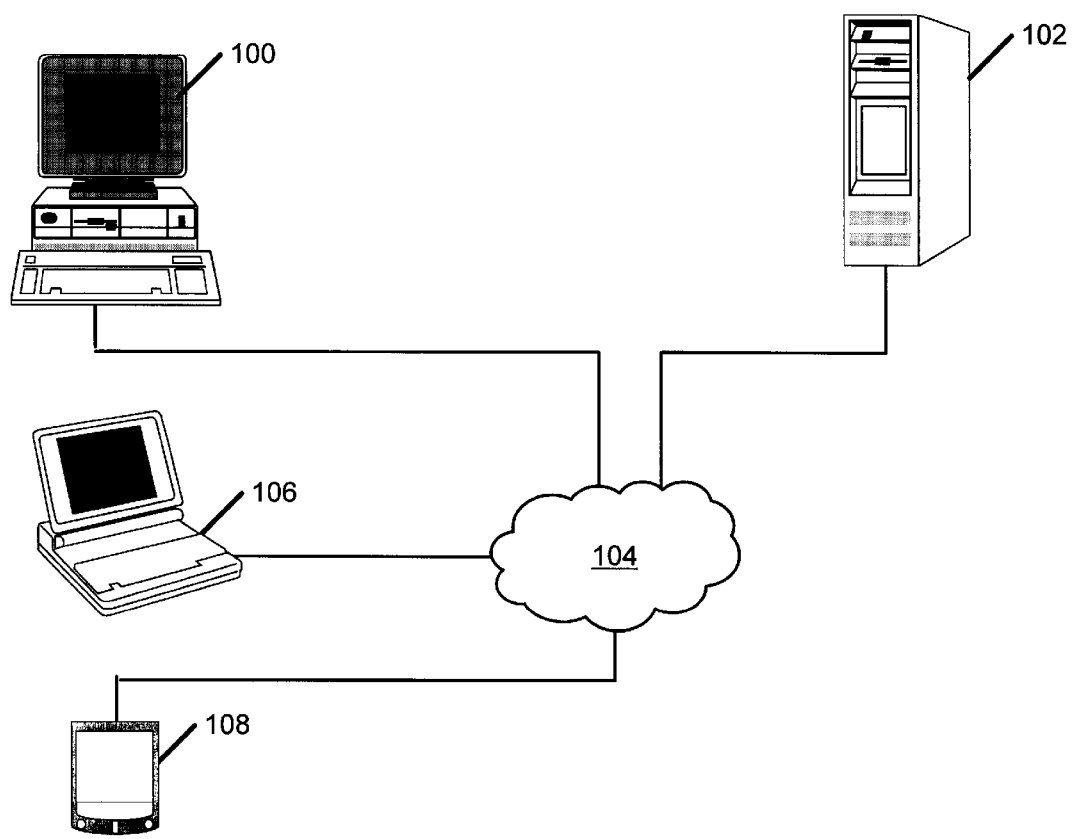
FIG. 1 illustrates a general hardware environment according to one embodiment of the invention.

FIG. 1 illustrates a general hardware environment according to one embodiment of the invention. Also described are general overviews of some features and advantages of illustrated embodiment. A client 100, operated by a user/person or expert system (artificial intelligence), communicates with a search server 102 through a network 104 such as the internet. Other clients 106, 108 also communicate with the search server. Generally, a user of the client 100 may perform searches, with results provided according to preferences associated with the user. These results can also be made available to other users, such as operators of clients 106, 108.

Source documents (e.g., search results) can be returned to a user "as is," or in a "distilled format" format, which is a reduced content version of a source document. For example, for a text document, distillation provides a condensed abstract of the document based on the content (language, tags, patterns, etc.) within the source document. Distillation is advantageous for client devices having limited display areas, such as Personal Digital Assistants (PDA), portable computers, Wireless Application Protocol (WAP) enabled devices, such as mobile phones, pagers, two-way radios, and "smartphones," and other portable communication or computing devices having limited screens and/or computing resources (the phrase "mobile device" will be used to generally reference such PDAs, WAP enabled devices, portable communication or computing devices, etc.). Distillation is also generally helpful as it may be configured to provide a consistent interface displaying brief (per user preferences) overviews of source documents, thus allowing, for example, one to quickly determine the relevance of particular search results.

In one embodiment, a user of the client 100 and clients 106, 108 contact the search server 102 to submit search criteria and receive results thereto. It is expected that searches are keyword or natural language queries. It will be appreciated, however, that searching is not limited to text searches. For example, pattern analysis or image recognition may be applied to image data to locate images by their data content. Search results are obtained through comparisons of search criteria with known search domains (see FIG. 2) such as previously indexed web pages 202, meta-searches 204, by piggy-backing onto special purpose search resources 206 (e.g., utilizing existing resources and capabilities of a special purpose search resource), or searching against saved searches 208 of other users.

In one embodiment, search results are packaged with a tag-based structured language such as the extensible Markup Language (XML), Hypertext Markup Language (HTML), Dynamic HTML (DHTML), or the like, where output is structured according to characteristics of a particular viewing device. For example, in restrictive viewing/browsing environments such as those provided by mobile devices, results will be automatically structured to comport with the device's limitations. It is assumed herein that results are provided in an XML type of language, and that results may be associated with semantic and/or syntactic tag attributes to facilitate cross-referencing different search results.

In one embodiment, an application programming interface (API) is provided for interfacing with a search server 102. The API provides in interface to the search server, through which third party developers (or users) can provide search services that are integrated with the search server. In addition, the API will enable search server administrators to extend the capabilities or customize a search server without modification to the underlying searching engine employed by the search server. In one embodiment, the API is implemented by way of executable objects, such as ActiveX controls to JavaBeans (which are Java-based platform-independent controls developed by Sun Microsystems, Inc. of Palo Alto, Calif.); it will be appreciated other object formats can be used.

Figure 2:
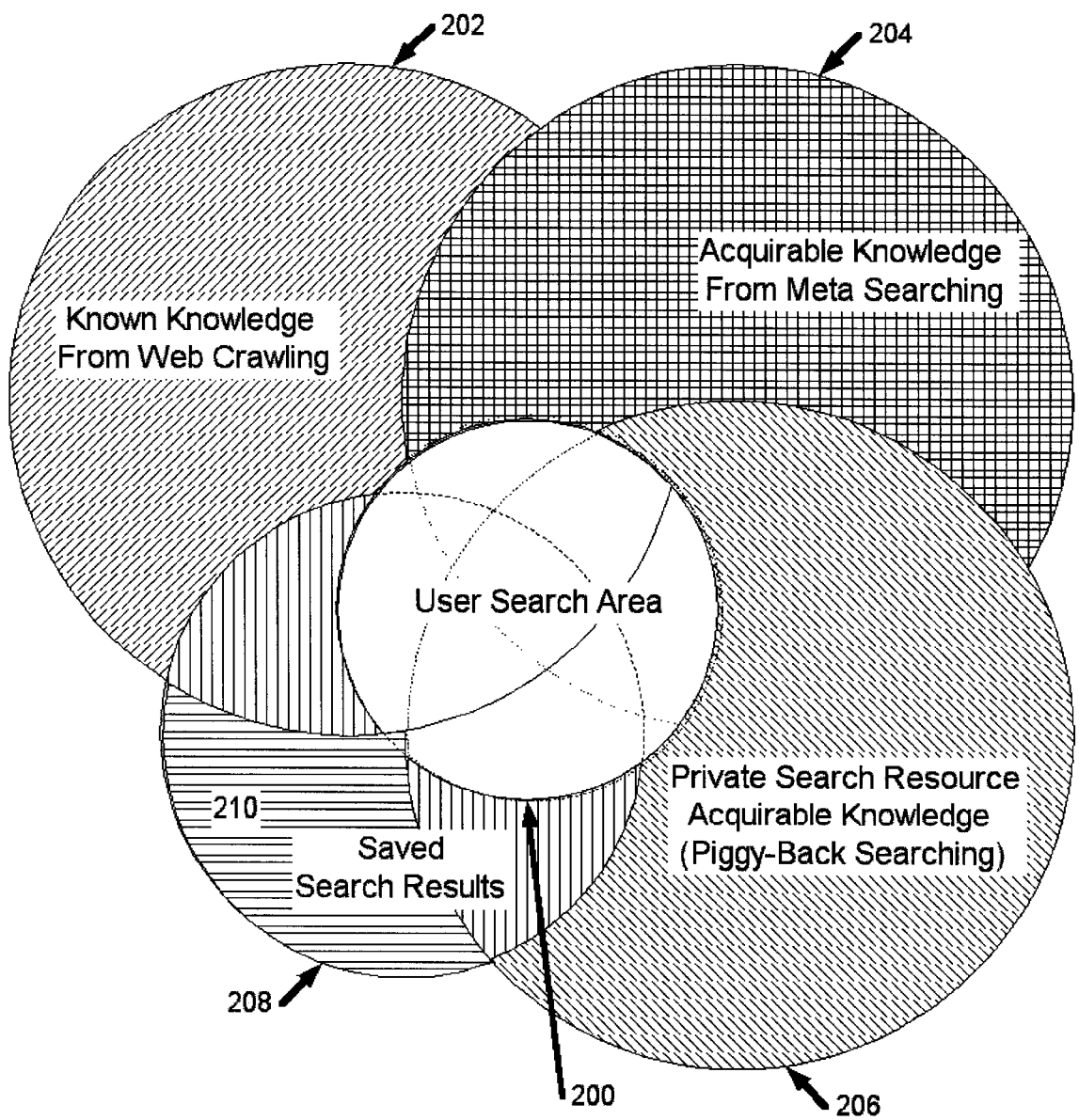
FIG. 2 illustrates exemplary search domains utilized by the FIG. 1 embodiment of the invention.

FIG. 2 illustrates exemplary search domains utilized by the FIG. 1 embodiment of the invention. The central circle 200 pictorially corresponds to the "universe" of a user's search query, e.g., the theoretical extent of a search as determined by the particular search criteria and search limiting options set by a user. The upper left circle 202 corresponds to data previously known to a search server by way of prior data acquisition, web crawling, etc. The intersection of the user's query 200 and known knowledge 202 corresponds to search results from within this known knowledge that satisfies the user's search query.

The upper right circle 204 corresponds to acquirable knowledge from performing meta-searches, e.g., searches by way of other search engines. As with the known knowledge, intersection of the acquirable knowledge circle 204 circle with the query circle 200 corresponds to relevant search results from this particular search domain. Therefore, the combination of circles 202, 204 comprises knowledge obtained from public search resources.

The lower right circle 206 corresponds to acquirable knowledge from piggy-backing onto special purpose search resources provided by individual web sites, such as those search engines provided by universities, government web sites, or the like. In the piggy-back configuration, the invention may, for example, visit a private or special purpose local search page for the Massachusetts Institute of Technology, execute a search thereon, and provide search results to the user (see FIGS. 3, 4), which can be combined with knowledge 202, 204 obtained from public search resources.

The lower left circle 208 corresponds to search results stored by the search server 102 and made publicly available by the users generating the results. These publicly accessible results can be included when performing the user's search, and contribute to the current user's search. One advantage of saving previous search result objects for later sharing is that, as illustrated, there can be a portion 210 of saved search data that is no longer available to other search techniques, thus filing in knowledge gaps resulting from rapid changes in online data content.

Figure 3:
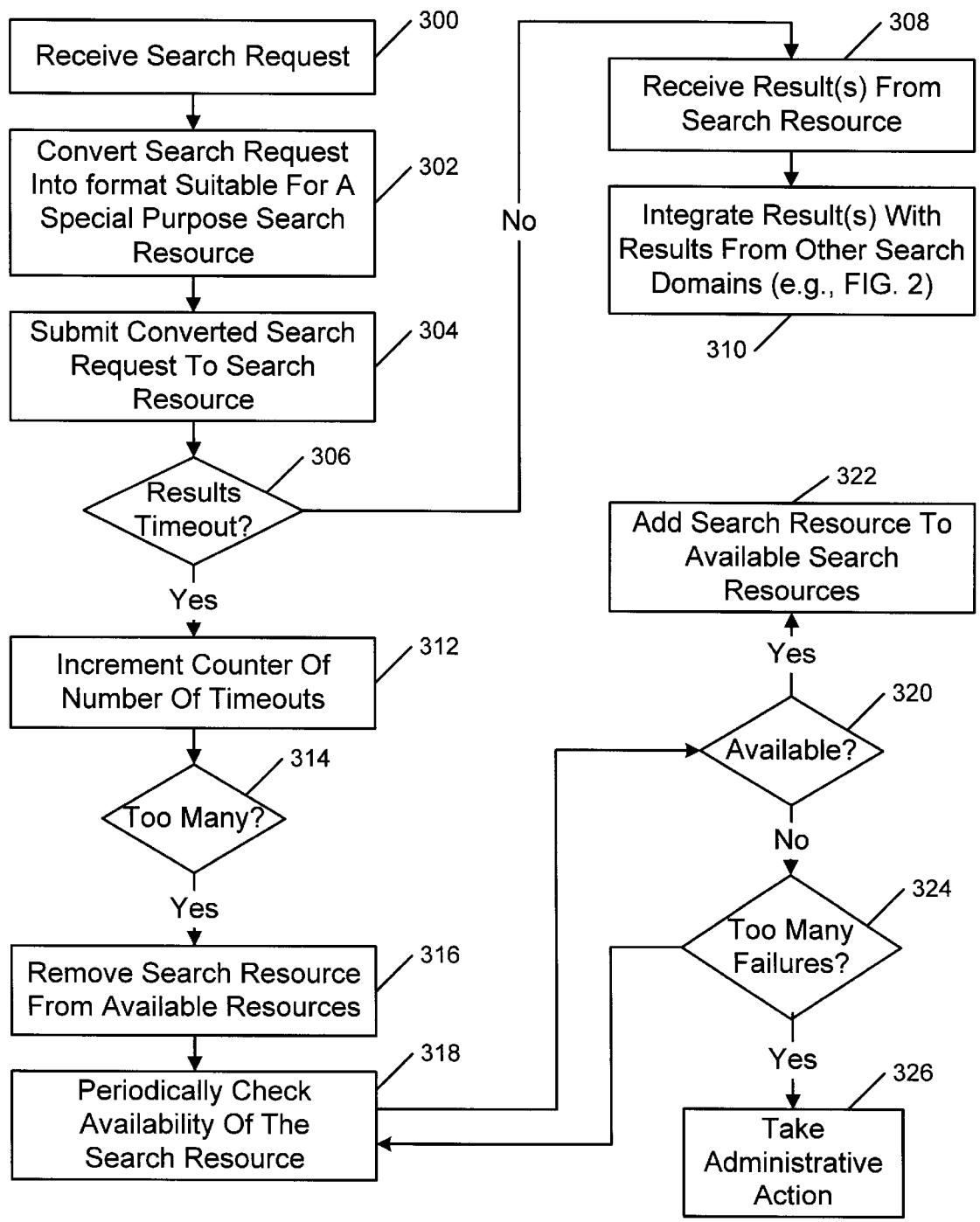
FIG. 3 is high level flowchart illustrating utilizing FIG. 2 special purpose search resources.

FIG. 3 is high-level flowchart illustrating utilizing FIG. 2 special purposes search resources 206. Please note that although figures may present a particular ordering of operations, one will appreciate that a different ordering may be used, and that many operations may be performed in parallel. The particular ordering illustrated is for exemplary purposes only. It is assumed that special purpose search resources include extant on-line search sources (e.g., corpus, organizational, documents, intranet, Internet web sites, archives, etc.), and search results are integrated with other search results obtained from searching other source domains (see, e.g., FIG. 2).

A search request is received 300 from a user, causing a receiving search server 102 to initialize a search thread (parallel processing is assumed unless a search dependency requires serialization) for each special purpose search resource to be used towards completing the search request (in addition to search threads for searching other source domains). Thus, a particular special purpose search resource is selected 302 from a collection of known special purpose search resources. Associated with each such special purpose search resource is a characteristic profile (e.g., stored in a data file, database record, etc.) indicating how to effect a search with the special purpose search resource (see FIG. 4). Based on the characteristic profile, the user's received 300 search query is converted (if required) into a format suitable for the selected 302 search resource.

The converted query is submitted 304 to the special purpose search resource. In one embodiment, an automatic system is used by a search server to monitor special purpose search resource to identify when they appear to be off-line or otherwise unavailable. It will be appreciated that this determination may also be applied to determining availability of other search resources such as public search resources.

Thus, after submitting 304 the search query, a time out test 306 (e.g., a waiting period timeout loop (not illustrated) is performed to determine whether results to the search were received within a certain timeout period. If there was no timeout, then resultant data is received 308 by the search server and integrated 310, e.g., duplicates removed, sorted, etc. according to the searcher's preferences (see related application Nos. 09/565,674 and 09/336,020), into search results obtained from searching other search domains (e.g., FIG. 2 items 202, 204). In one embodiment, duplicate results are identified by hashing search result URLs and/or document titles and removing URLs having duplicate hash values.

In one embodiment, before removing duplicates, the number of duplicates for a result is counted so as to determine a relative referencing ranking of a duplicated result. Such a ranking suggests a relative popularity or relevance of a result, and this ranking can be used, either automatically or per user preference, to sort results after removing the duplicates. In one embodiment, a knowledge representation symbol/icon (not illustrated) can be associated with a search result to provide a visual cue as to a result's relative reference ranking.

If there was a timeout, then a counter of the number of timeouts for the special purpose search resource is incremented 312. If 314 there were too many timeouts, e.g., 25, for the search resource, then the special purpose search resource is removed 316 from the collection of available (e.g., identified) search resources. The special purpose search resource is then periodically checked 318 for re-availability. If 320 the search resource becomes available, then it is added 322 back to the collection of special purpose search resources for use in subsequent user searches. If 320 the search resource remains unavailable, and if 324 there have not been to many unavailability failures, then the search resource continues to be periodically checked 318 for availability.

If 320 the search resource remains unavailable, and if 324 there have been too many availability failures, then automatic administrative action is taken 326. In one embodiment, administrative action includes E-mailing an administration that there is a problem with the special purpose search resource. In another embodiment, such action includes adding the failed search resource to a low-priority queue for intermittent checking for availability, where testing only occurs when the search server is idle, or after extended periods of time, e.g., on a weekly or monthly basis. Eventually, the failed special purpose search resource is deemed unavailable and it can be deleted from the search server's records.

Figure 4:
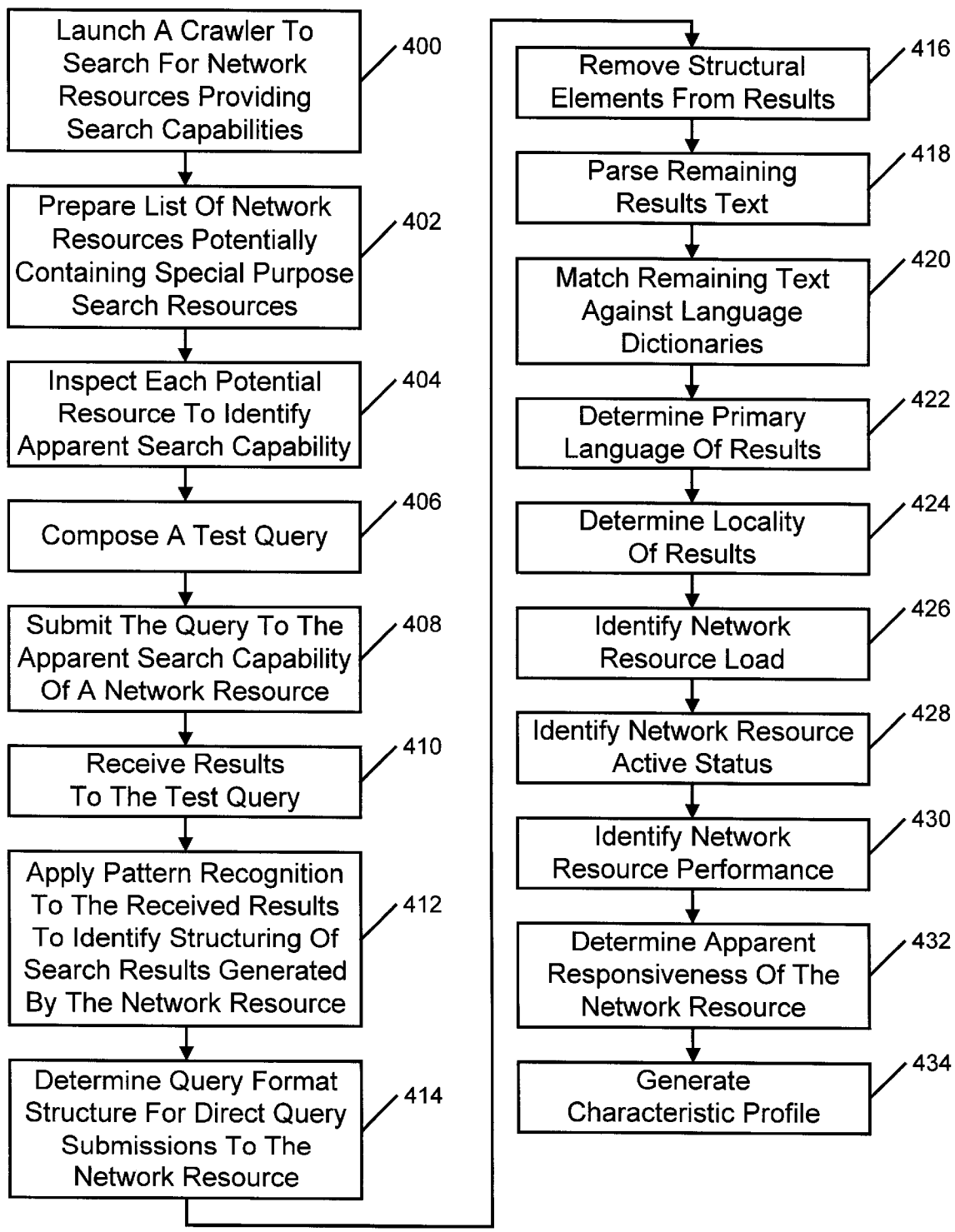
FIG. 4 is a flowchart illustrating the process of identifying special purpose search resources and building associated characteristics profiles for such resources.

FIG. 4 is a flowchart illustrating the process of identifying special purpose search resources and building associated characteristic profiles. A search server 102 (FIG. 1) launches a crawler 400 which uses key words to search for networked resources providing private or special purpose searching abilities. For example, the search sever may search using keywords such as search, input type, form, size, submit, etc., all of which are terms commonly used to define web pages search ability. In one embodiment, in addition to crawling, as a user utilizes a search server 102 to perform searches, the user's search results are processed as discussed below to identify whether any results contain a special purpose search resource.

Note that this discussion assumes searching for web pages that provide searching ability. It will be appreciated that other search abilities, such as gopher searches or Wide Area Information Server (WAIS) searches, can be similarly identified and made available as a special purpose search resource 206 (FIG. 2) as disclosed herein. It will be further appreciated that launching 400 the crawler may occur continuously, or automatically on an intermittent basis, or through manual invocation, so as to augment previously identified special purpose search resources.

The search engine then prepares 402 a list of potential special purpose search resources (a new list or an update to an existing list). Each search result is then inspected to determine 404 which potential search results appear to contain special purpose search resources, such as a search form on a web page. In one embodiment, the search server looks for occurrences of certain attributes, such as XML, HTML, DHTML, definitions, which indicate presence of a search ability within a particular search result (e.g., web page or other network resource). Examples of identifiable search abilities are the term "Search" followed by an HTML "input form", or the term "search" embedded within an HTML "form action" (e.g. <FORM METHOD=GET ACTION="/search/"><INPUT TYPE=HIDDEN . . .><INPUT TYPE=TEXT . . .>). The search server maintains an inventory of varied terminology and string patterns that might represent the existence of search capabilities within source code. Pattern matching is effective because search capabilities are implemented using a fine set of tags (e.g., HTML definitions), and results are returned in one of several recognizable structured formats (e.g., repetitious structures such as tables).

If a search result appears to be a special purpose search resource, then the search server 102 composes 406 a test query, such as an easily identifiable or unique search string. The test query is submitted 408 to the special purpose search resource. In the case of a search form (or other identified search structure), a query is submitted as input to the search form. In response, search results are received 410. Pattern recognition techniques, such as regular expressions pattern matching rules (e.g., akin to the Unix "grep" command), expert-type systems employing language analysis, language structure interpretation, comparisons between visual structure described on a page (e.g., a table defined with HTML commands) and positions of links and text, etc., are then applied to the search results to identify 412 how the particular special purpose search resource structures its search results.

For example, if pattern recognition techniques indicate that the special purpose search resource responded to the test query with a table, where each table cell contains text and an HTTP hyperlink, it can be assumed that the hyperlink is a search result, and the text is its title (other interpretations can be used). It will be appreciated that further pattern recognition can be used to confirm interpretations, perhaps through iterative application of pattern recognition, e.g., looking for repetition of patterns that distinguish identified entries, looking for proper tag/document structure, looking for key words to distinguish, for example, copyright text from title descriptions or anchored text. It will be further appreciated that varied recognition techniques can be applied to determine the structure and content of data returned by a special purpose search resource.

The resultant data from the test query is also inspected to identify 414 the structure of any search queries strings corresponding to the search. For example, many search engines construct an HTTP address (e.g., within the "Address" bar of a browser) corresponding to the search query. Other search engines might construct a script (e.g., JavaScript, Visual basic, or the like) for the query. Since the test query used known identifiable terms, the search results can be analyzed to automatically determine the structure of the search query, e.g., the URL string 508 (FIG. 5), so that a search engine may later feed particular user search queries to the special purpose search resource. If there are no identifiable HTTP address constructions, or programming constructions, corresponding to the test query, then the originally identified search form (or other construction) used to perform the test query can be used to generate results from the special purpose search resource.

In addition, source text can optionally be analyzed to identify the written language, geographical location, and other characteristics of search resources. To do so, one or more results received from the special purpose search resource is processed by removing 416 all structural/programming language elements from the source (e.g., XML, HTML, Java, Javascript, etc.), leaving behind the basic text for the special purpose search resource. This remaining text is parsed 418 and matched 420 against language dictionaries to determine 422 a primary language (e.g., English, French, etc.) for the special purpose search resource. Geographical location can be determined 424 based on analysis of the network location (e.g., Internet Protocol (IP) address) for the special purpose search resource, and/or through analysis of the language structure, syntax, etc., used in source text.

In one embodiment, other characteristics of interest that are determined include network resource load 426, active status 428, performance 430, and apparent response time 432 of the special purpose search resource. A search server 120 can use these identified values 416–432 to prioritize search resources. Additionally, a search server 102 may decide to remove a special purpose search resource based on these values, e.g., as in the FIG. 3 removal due to timeouts, so to avoid search resources with high loads or other undesirable attributes. In one embodiment, a user performing a search can set preferences, as discussed in relation application Nos. 09/565,674 and 09/336,020, for arranging, filtering, ranking, excluding, sorting, etc., search results based on these characteristics.

Once a special purpose search resource has been identified, and its characteristic 416–432 identified, a characteristic profile is generated 434 for the special purpose search resource (e.g., FIG. 5). At a minimum, a characteristic profile contains data describing how to effect a search through the special purpose search resource and how to parse the results. Thus, as discussed above for FIG. 3, when a search server 102 receives and executes a user's search query, in addition to searching public search resources 202, 204, the search server also sends the query to known special purpose search resources for processing.

In one embodiment, the existence of a characteristic profile in a certain location, such as a particular folder or directory, is used by a search server to determine the availability of identified special purpose search resources. If a special purpose search resource is temporarily or permanently removed from availability, such as described in FIG. 3, then the characteristic profile is moved into another folder or directory, or simply deleted, according to its disablement status. In an alternate embodiment, a search server 102 maintains a list of identified special purpose search resources, each list entry pointing or incorporating the characteristic profile for special purpose search resources. In this embodiment, the list includes a flag for designating whether the special purpose search resource is active or has been disabled, and permanently disabled search resources can be deleted from the list.

FIG. 5 illustrates a partial characteristic profile 500 that has been filled out for an exemplary search resource (www-altheweb-com). This characteristic profile is automatically completed per FIG. 4. The characteristic profile is structured according to name 502/value 504 pairs. The engine name 506 stores the name of the special purpose search resource. The engine.urlstring 508 stores the identified 414 syntactical pattern 510 representing the structure of the special purpose search resource's searching syntax, e.g., how to properly formulate a query for the special purpose search resource. The engine.result.list.start 512 stores the format for how to recognize the identified 414 structure indicating the start of search results that will be obtained by executing a query to a special purpose search resource according to the syntactical pattern 510. The engine.result.item.start 514 and engine.result.item.end 516 respectively store how to recognize the identified 414 structure for the start and end of each individual search result for the special purpose search resource.

The engine.ahref.start 518 and engine.ahref.end 520 respectively store the patterns for recognizing the identified 414 structure for the start and end points of hperlinks within the special purpose search resource's source code. (As illustrated, HTML<A HREF></A> pairings were determined as being used to reference hyperlinks.) The engine.depth.goesdeep 522 stores whether the server has an option for performing an extended or "deeper" search, e.g., setting how many search results are returned. If the special purpose search resource has no such option, then this entry can be used as a signal to a search server 102 to use a designated timeout for on obtaining search results from the special purpose search resource.

It is intended that characteristic profiles be created in real-time as the search server 102 crawls 400 and processes crawler results, and as user search results are similarly processed.

Continuing again with FIG. 4, in one embodiment, a search server maintains a database of rules and criteria for managing special purpose search resources, which an administrator can access via a graphical user interface (GUI) not shown). The criteria includes such items as: thresholds for high-frequency rating (e.g., accesses gauge popularity of a particular site), thresholds restricting the number of search sources to be inspected per language or locality, thresholds for turnover frequency and refresh rates, where to report "parsing errors," which occur if a special purpose search resource changes its search syntax (e.g., the FIG. 5 engine.urlstring 508), time-out thresholds for specific search sources, types or localities of sources, number of timeout retries before taking a source off line, the period of time to keep a source off line before re-trying, etc.

These rules and criteria can be used to control whether certain special purpose search resources are included during a user's search. The rules and criteria can also be checked for validating/rejecting identified 404 special purpose search resources. Thus, only special purpose search resources meeting requirements for language, locality, response time, etc. will be used to supplement user searches. In one embodiment, the search server 102 uses user response metrics, number of search results served, number of search sources per language and locality, etc. to assign priorities to search resources (public or special purpose) to dynamically identify best performing search resources.

Thus, once special purpose search resources have been identified as discussed above for FIG. 4, a search of the FIG. 2 domains may be performed as discussed above for FIG. 3. As discussed in related application Nos. 09/565,674 and 09/336,020, a user of a search server 102 may be performing a search with a portable device having restricted output capabilities; in such circumstances, the search server 102 culls out or filters content from search results to be compatible with the portable device.

In one embodiment, the search server 102 also maintains a database frequent (e.g., common) search strings executed by users. This database includes related information such as the frequency of searches for each search string (criteria), the number of results provided for that search string, the number of items in the results actually used (visited) the user, and duration metric for time a user spent on any one of the items from a search. For high-frequency search strings, e.g., "holocaust" or "global warming," the search server sorts results (e.g., URLs) and does an HTTP header seek on these high-frequency URLs to determine a data of last change for the URL to determine an estimated frequency at which each URL turns over data of last change). The server can then determine if each of the results (URLs) for a given high-frequency search is current, whether it exits (e.g., no HTTP 401/404 or equivalent errors), and thus decide whether to cache the results for a particular search string on the search server, such as for a time period less than the estimated turnover. If result URLs for a search string are cached, the server will present these results in response to a subsequently submitted query using the same search criteria for a particular language and locality.

Figure 6:
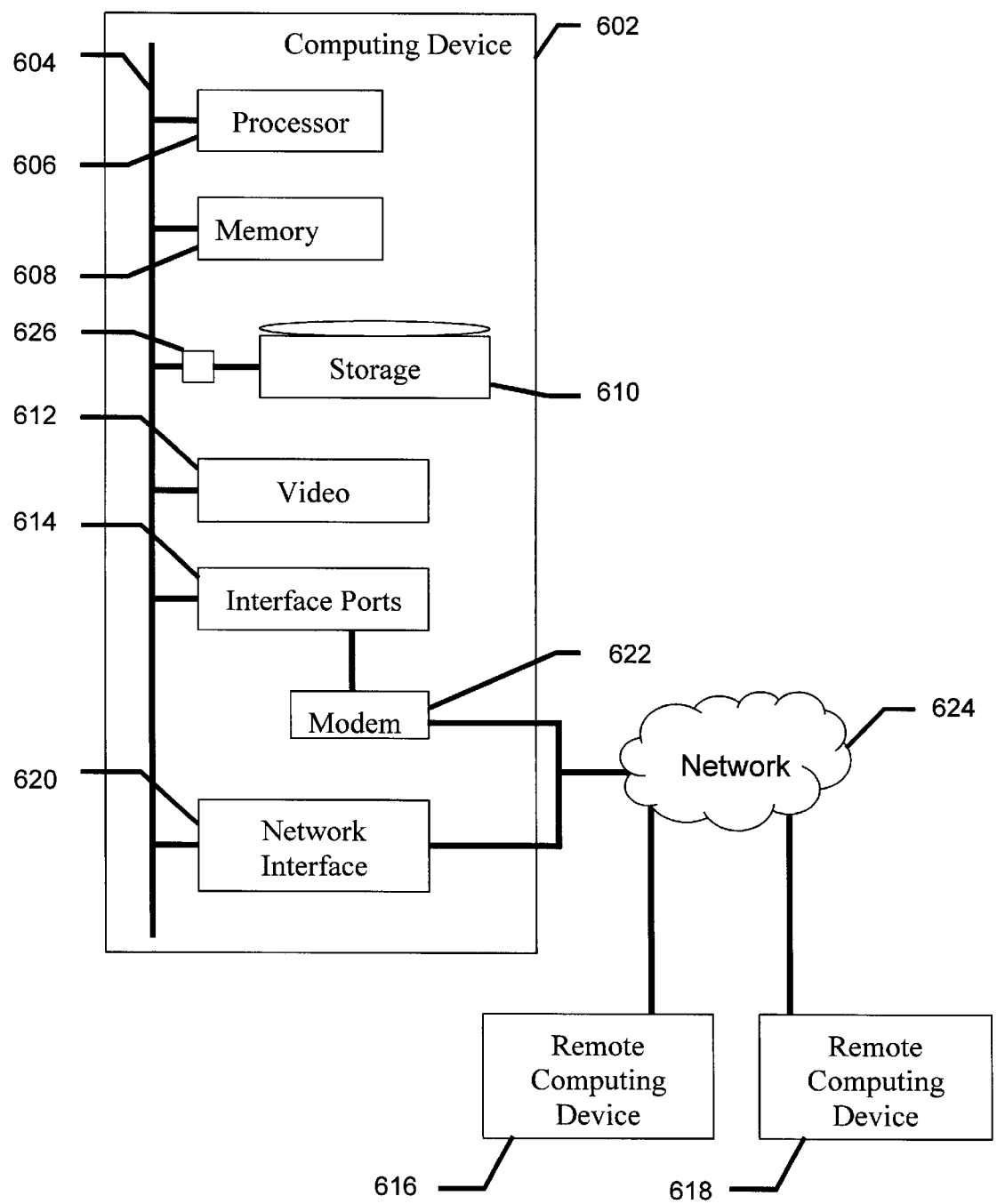
FIG. 6 illustrates a suitable computing environment in which certain aspects the illustrated invention may be practiced.

FIG. 6 and the following discussion are intended to provide a brief, general description of a suitable computing environment in which clients 100, 106, 108, search server 102, and other aspects of the illustrated invention may be implemented. Portions of the invention may be described by reference to different high-level program modules and/or low-level hardware contexts. Those skilled in the art will realize that program module references can be interchanged with low-level hardware instructions.

It will also be appreciated that most or all of the functionality discussed above for the search server 102 (FIG. 1) can be entirely incorporated into the client device 100 (FIG. 1), or processing shared (according to an appropriate handshaking protocol). In one embodiment, the handshaking protocol allows the client to negotiate with the search server for determining which tasks the client will or is willing to perform. In an alternate embodiment, the client directly accesses a data source, or monitors an ongoing data stream (e.g., a music, data, information ticker, etc.), and performs the distillation process on the monitored data.

Program modules include procedures, functions, programs, components, data structures, and the like, that perform particular tasks or implement particular abstract data types. The modules may be incorporated into single and multi-processor computing systems, as well as hand-held devices and controllable consumer devices (e.g., mobile devices, set-top boxes, Internet appliances, etc.). It is understood that modules may be implemented on a single computing device, or processed over a distributed network environment, where modules can be located in both local and remote memory storage devices.

An exemplary system for implementing portions invention include a computing device 602 having system bus 604 for coupling various components within the computing device. The system 604 bus may be any of several types of bus structures, such as PCI, AGP, VESA. Microchannel, ISA and EISA, etc. Typically, attached to the bus 604 are processors 606 such as Intel, DEC Alpha, PowerPc programmable gate arrays, etc., a memory 608 (e.g., RAM, ROM, PROM, EEPROM, etc.), storage device 610, a video interface 612, and input/output interface ports 614.

The storage systems and associated computer-readable media provide storage of data and executable instructions for the computing device 602. Storage options include hard-drives, floppy disks, optical storage, magnetic cassettes, tapes, flash memory cards, memory sticks, digital video disks, and the like, and may be connected to the bus 604 by way of an interface 626.

Processors for the client 100 and search server 102 may be directed according to programming instructions encoded within nonvolatile memory (ROM, EPROM, E/EPROM, F/PGA, etc.), application specific integrated circuits (ASICs), or as part of the instructions for an operating system (e.g., the Microsoft Windows CE, Palm Computing, or other operating system may be extended to support the above-described search and distillation processes).

Computing device 602 is expected to operate in a networked environment using logical connections to one or more remote computing devices 616, 618 through a network interface 620, modem 622, or other communication pathway. Computing devices may be interconnected by way of a network 624 such as a local intranet or the Internet. Thus, with respect to the illustrated embodiments, assuming computing device 702 is a client seeking to perform a search, then remote devices 616, 618 may be a search server 716 and another searcher 618.

It will be appreciated that remote computing devices 616, 618 may be configured like computing device 602, and therefore include many or all of the elements discussed for computing device 602. It should also be appreciated that computing devices 602, 616, 618 may be embodied within a single device, or separate communicatively-coupled components, and include routers, bridges, peer devices, web servers, and application programs utilizing network application protocols such as HTTP, File Transfer Protocl (FTP). Gopher, Wide Area Information Server (WAIS), and the like.

Having described and illustrated the principles of the invention will reference to illustrated embodiments, it will be recognized that the illustrated embodiments can be modified in arrangement and detail without departing from such principles.

And, even though the foregoing discussion has focused on particular embodiments, it is understood that other configurations are contemplated. In particular, even though expressions such as "in one embodiment," "in another embodiment," and the like are used herein, these phrases are meant to generally reference embodiment possibilities, and are not intended to limit the invention to particular embodiment configurations.

As used herein, these terms may reference the same or different embodiments, and unless expressly indicated otherwise, are combinable into other embodiments. Consequently, in view of the wide variety of permutations to the above-described embodiments, the detailed description is intended to be illustrative only, and should not be taken as limiting the scope of the invention. What is claimed as the invention, therefore, is all such modifications as may come within the scope and spirit of the following claims and equivalents thereto.

What is claimed is:

1. A method for searching for data with public search engines and special purpose search resources, comprising:
   identifying a general purpose public search engine;
   identifying a special purpose search resource;
   submitting a search query to the public search engine, and receiving a first result in response thereto:
   submitting the search query to the special purpose search resource, and receiving a second response thereto;
   merging said first and said second result into a combined search result;
   determining user restrictions for characteristics of search results, said characteristics including selected ones of written language type, result origin, and language complexity;
   identifying characteristics for a selected one of said combined search result;
   comparing said identified characteristics to said user restrictions to identify restricted characteristics; and
   if restricted characteristics are identified, then excluding said selected one from said combined result.

2. A method for searching for data with public search engines and special purpose search resources, comprising:
   identifying a general purpose public search engine;
   identifying a collection of known special purpose search resources;
   determining a responsiveness factor for each special purpose search resource in said collection;
   comparing said responsiveness factor to a threshold value;
   excluding special purpose search resources according to said comparing;
   submitting a search query to the public search engine, and receiving a first result in response thereto;
   submitting the search query to at least one of the non-excluded serial purpose search resources, and receiving a second response thereto; and
   merging said first and said second result into a combined search result.

3. The method of claim 2, further comprising:
   counting a number of duplicates within said combined search result so as to determine a relative reference ranking for duplicated search results; and
   making the combined search result according to said determined relative reference ranking for duplicated search results.

4. The method of claim 2, in which the public search engine is provided by a search engine business, and wherein the special purpose search resource only searches within a restricted domain of sources directly affiliated with the special purpose resource.

5. The method of claim 2, wherein the public search engine searches an unrestricted domain of sources including sources unrelated to the public search engine, and
   wherein the special purpose search resource only searches within a restricted domain of sources directly affiliated with the special purpose resource.

6. The method of claim 2, wherein the public search engine searches within an arbitrary number of Internet domains, and the special purpose search resource searches within a restricted number of Internet domains.

7. The method of claim 2, further comprising:
   associating a user-selectable control with a selected one of said combined search result; and
   configuring the user-selectable control such that selection thereof causes a real-time distillation of said selected one into a condensed representation thereof.

8. The method of claim 7, further comprising:
   providing a user interface; and
   displaying said combined search result in the user interface.

9. The method of claim 8, wherein the user interface is a browser.

10. A method for searching for data with public search engines and special purpose search resources, comprising:
    identifying a general purpose public search engine;
    identifying a first special purpose search resource;
    identifying a second special purpose search resource;
    submitting a search query to the public search engine, and receiving a first result in response thereto;
    submitting the search query to the first and the second special purpose search resource, and receiving a second response thereto;
    merging said first and said second result into a combined search result;
    determining that said first special purpose search resource and said second special purpose search resource return at least one duplicative search result;
    computing responsiveness factors for said first and second special purpose search resource, and comparing said responsiveness factors so as to determine a slower special purpose resource; and
    excluding the slower special purpose resource from subsequent searching.

11. A method for searching for data with public search engines and special purpose search resources, comprising:
    identifying a confirmed special purpose search resource, wherein a process for determining at least one confirmed special purpose comprises the following steps:
    performing a search with a search engine, said search utilizing terms commonly associated with searching capabilities provided by a network site;
    receiving a first search result responsive to the search;
    inspecting a data source for a selected one of said search result so as to determine an apparent search capabilities for said selected one;
    submitting a test query to said apparent search capability; and determining if a second search result is received in response to the test query, and if so, confirming said selected one is a special purpose search response; and identifying a general purpose public search engine;

submitting a search query to the public search engine, and receiving a first result in response thereto;

submitting the search query to the confirmed special purpose search resource, and receiving a second response thereto;

merging said first and said second result into a combined search result.

12. The method of claim 11, further comprising:

adding the confirmed special purpose search resource to a collection of confirmed special purpose search resource;

verifying whether said confirmed special purpose search resource provides search responses within a timeout period, and if not, incrementing an error counter; and verifying whether the error counter exceeds a maximum error threshold, and if so, removing said confirmed special purpose search resource from said collection.

13. The method of claim 12, further comprising:

periodically testing said confirmed special purpose search resource for providing search responses within the timeout period, and if so, resetting the error counter to a zero-bound lesser value.

14. The method of claim 12, wherein each operation of the method for determining a confirmed special purpose search resource is performed automatically by a search server without manual intervention.

15. The method of claim 11, further comprising:

associating a characteristic profile with said confirmed special purpose search resource;

determining a search query network address to which subsequent searches for said confirmed special purpose search resource can be submitted; and storing the search query network address within the characteristic profile;

wherein said submitting the search query to the special purpose search resource comprises retrieving said stored query network address and submitting the search query thereto.

16. A method for identifying a search resource, comprising:

performing a search with a general purpose search engine, said search utilizing terms commonly associated with searching capabilities provided by a network site;

receiving a first search result responsive to the search;

inspecting a source encoding for a selected one of said search result so as to determine an apparent search capability for said selected one;

submitting a test query to said apparent search capability, and determining if a second search result is received in response thereto;

wherein receipt of the second search result confirms a search capability for said selected one.

17. The method of claim 16, wherein said inspecting the source encoding includes searching for a form definition within said source encoding.

18. The method of claim 16, further comprising:

determining a search query URI, for directly submitting subsequent searches to said confirmed search capability of said selected one.

19. The method of claim 16, wherein inspecting the source encoding comprises:

providing a pattern matching pattern for isolating a portion of the source encoding; and applying said pattern to the source encoding so as to isolate the portion.

20. The method of claim 19, wherein said portion is a selected one of a title and a hypertext link.

21. A readable medium having encoded thereon instructions for searching for data with public search engines and special purpose search resources, said instructions, which when executed by a processor, are capable of directing the processor to:

identify a general purpose public search engine;

identify a special purpose search resource;

submit a search query to the public search engine, and receive a first result in response thereto;

submit the search query to the special purpose search resource, and receive a second response thereto;

merge said first and said second result into a combined search result;

determine user restrictions for characteristics of search results, said characteristics including selected ones of written language type, result origin, and language complexity;

identify characteristics for a selected one of said combined search result; compare said identified characteristics to said user restrictions to identify restricted characteristics; and determine if restricted characteristics are identified, and exclude said selected one from said combined result.

22. The medium of claim 21, in which the public search engine is provided by a search engine business, and wherein the special purpose search resource only searches within a restricted domain of sources directly affiliated with the special purpose resource.

23. The medium of claim 21, wherein the public search engine searches an unrestricted domain of sources including sources unrelated to the public search engine, and wherein the special purpose search resource only searches within a restricted domain of sources directly affiliated with the special purpose resource.

24. The medium of claim 21, said programming instructions including further instructions to direct the processor to:

associate a user-selectable control with a selected one of said combined search result; and configure the user-selectable control such that selection thereof causes a real-time distillation of said selected one into a condensed representation thereof.

25. A readable medium having encoded thereon instructions for searching for data with public search engines and special purpose search resources, said instructions, which when executed by a processor, are capable of directing the processor to:

identify a general purpose public search engine;

identify a collection of known special purpose search resources;

determine a responsiveness factor for each special purpose search resource in said collection;

compare said responsiveness factor to a threshold value;

exclude special purpose search resources according to said comparing:

submit a search query to the public search engine, and receive a first result in response thereto;

submit the search query to at least one of the non-excluded special purpose search resources, and receive a second response thereto; and merge said first and said second result into a combined search result.

26. A readable medium having encoded thereon instructions for searching for data with public search engines and special purpose search resources, said instructions, which when executed by a processor, are capable of directing the processor to:

identify a general purpose public search engine;

identify a first special purpose search resource;

identify a second special purpose search resource;

submit a search query to the public search engine, and receive a first result in response thereto;

submit the search query to the first and the second special purpose search resource, and receive a second response thereto;

merge said first and said second result into a combined search result;

determine that said first special purpose search resource and said second special purpose search resource return at least one duplicative search result;

compute responsiveness factors for said first and second special purpose search resource, and compare said responsiveness factors so as to determine a slower special purpose resource; and exclude the slower special purpose resource from subsequent searching.

27. A readable medium having encoded thereon instructions for searching for identifying a special purpose search resource, said instructions, which when executed by a processor, are capable of directing the processor to:

perform a search with a general purpose search engine, said search utilizing terms commonly associated with searching capabilities provided by a network site;

receive a first search result responsive to the search;

inspect a data source for a selected one of said search result so as to determine an apparent search capability for said selected one;

submit a test query to said approach search capability; and determine if a second search result is received in response to the test query, said determining confirming a search capability for said selected one.

28. The medium of claim 27, wherein said instructions for inspecting the data source included further instructions for searching for an HTML form definition.

29. The medium of claim 27, said programming instructions including further instructions to direct the processor to:

determine a search query URL for directly entering subsequent searches to said confirmed search capability.

* * * * *

UNITED STATES PATENT AND TRADEMARK OFFICE
CERTIFICATE OF CORRECTION

PATENT NO.    : 6,601,061 B2
DATED         : July 29, 2003
INVENTOR(S)   : Holt et al.

It is certified that error appears in the above-identified patent and that said Letters Patent is hereby corrected as shown below:

Title Page,
Item [56], References Cited, U.S. PATENT DOCUMENTS, change "Seel" to
-- Seeley --

Drawings,
Figure 5, "518", column "504", change "<AH" to -- <AH> --

Column 1,
Line 34, change "searches" to -- searchers --
Line 38, change "resources." to -- resources." --

Column 2,
Line 36, change "extent" to -- extant --

Column 3,
Line 16, after "particular" insert -- information at a particular --
Line 35, change "in a "distilled format" format" to -- in a "distilled" format --

Column 4,
Line 2, change "extensible" to -- eXtensible --
Line 15, change "in" to -- an --

Column 5,
Line 33, before "such" change "resources" to -- resources, --
Line 35, after "(not illustrated)" insert -- ) --

Column 6,
Line 54, change "<INPUT     TYPE=" to -- <INPUT TYPE= --

Column 7,
Line 64, change "120" to -- 102 --

Column 8
Line 8, change "characteristic" to -- characteristics --
Line 35, change "altheweb-com)." to -- alltheweb-com). --
Line 37, change "engine name" to -- engine.name --

UNITED STATES PATENT AND TRADEMARK OFFICE
CERTIFICATE OF CORRECTION

PATENT NO. : 6,601,061 B2
DATED : July 29, 2003
INVENTOR(S) : Holt et al.

It is certified that error appears in the above-identified patent and that said Letters Patent is hereby corrected as shown below:

Column 9,
Line 5, after " (GUI)" insert -- ( --
Line 42, after " (visited)" insert -- by --
Line 43, before "duration" insert -- a --
Line 49, before "data" insert -- ( --
Line 51, change "exits" to -- exists --

Column 10,
Line 27, change "VESA." to -- VESA, --
Line 29, change "PowerPc" to -- PowerPC --
Line 66, change "(FTP)." to -- (FTP), --

Column 11,
Line 59, change "serial" to -- special --

Column 12,
Line 1, change "making" to -- ranking --
Line 65, change "capabilities" to -- capability --

Column 13,
Line 65, change "URI" to -- URL --

Column 16
Line 16, change "approach" to -- apparent --

Signed and Sealed this

First Day of June, 2004

JON W. DUDAS
*Acting Director of the United States Patent and Trademark Office*